(12) United States Patent
Inoue et al.

(10) Patent No.: US 7,219,193 B2
(45) Date of Patent: May 15, 2007

(54) FIFO CONTROL CIRCUIT

(75) Inventors: Noriko Inoue, Tokyo (JP); Yusuke Sugiura, Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 376 days.

(21) Appl. No.: 10/993,671

(22) Filed: Nov. 19, 2004

(65) Prior Publication Data

US 2005/0135159 A1 Jun. 23, 2005

(30) Foreign Application Priority Data

Nov. 20, 2003 (JP) ............................. 2003-390722

(51) Int. Cl.
*G06F 12/00* (2006.01)
(52) U.S. Cl. ........................................ 711/117; 710/52
(58) Field of Classification Search ................ 711/110, 711/116, 117, 118, 217, 218, 219; 710/52
See application file for complete search history.

(56) References Cited

U.S. PATENT DOCUMENTS

| 6,269,413 | B1 | 7/2001 | Sherlock |
| 6,339,558 | B1 * | 1/2002 | Ioki ............................ 365/221 |
| 6,529,951 | B1 | 3/2003 | Okuyama et al. |
| 6,643,816 | B1 | 11/2003 | Uesugi et al. |
| 6,701,390 | B2 * | 3/2004 | Ehmann ....................... 710/33 |
| 2003/0210709 | A1 | 11/2003 | Inoue |

* cited by examiner

*Primary Examiner*—Hiep T. Nguyen
(74) *Attorney, Agent, or Firm*—DLA Piper US LLP

(57) ABSTRACT

A FIFO control circuit for passing receive data and transmit data in a first-in first-out system, respectively, is provided. The FIFO control circuit comprises a receiving circuit; a transmitting circuit; a FIFO buffer for temporarily storing receive data received by the receiving circuit and transmit data to be transmitted by the transmitting circuit; a free space management circuit for managing free space of the FIFO buffer; a first address storage unit for storing an address range in which the receive data is stored in the FIFO buffer; a second address storage unit for storing an address range in which the transmit data is stored in the FIFO buffer; a write pointer control circuit writing the receive data and the transmit data; and a read pointer control circuit reading out the receive data and the transmit data from the FIFO buffer.

19 Claims, 13 Drawing Sheets

| START ADDRESS | END ADDRESS |
|---|---|
| 0x0000 | 0x3FFF |

FIG. 6A

| START ADDRESS | END ADDRESS |
|---|---|
| 0x0000 | 0x3FFF |
| 0x4000 | 0x8FFF |

FIG. 6B

| START ADDRESS | END ADDRESS |
|---|---|
| 0x0000 | 0x3FFF |
| 0x4000 | 0x8FFF |
| 0x9000 | 0xAFFF |

FIG. 6C

| START ADDRESS | END ADDRESS |
|---|---|
| 0x4000 | 0x8FFF |
| 0x9000 | 0xAFFF |

FIG. 7A

| START ADDRESS | END ADDRESS |
|---|---|
| 0x4000 | 0x8FFF |

FIG. 7B

| START ADDRESS | END ADDRESS |
|---|---|

FIG. 7C

TRANSMIT POINTER STRAGE UNIT

| |
|---|
| 0x4000_A |
| 0x8FFF_A |
| 0x7000_B |
| 0x8FFF_B |
| 0xC000_B |
| 0xFFFF_B |
| 0x4000_B |
| 0x6FFF_B |

FIG. 13B

RECEIVE POINTER STORAGE UNIT

| |
|---|
| 0x0000_A |
| 0x3FFF_A |
| 0x0000_B |
| 0x2FFF_B |
| 0x9000_A |
| 0xFFFF_A |
| 0x9000_B |
| 0xBFFF_B |

FIG. 13A

FIFO CONTROL CIRCUIT

CROSS-REFERENCE TO RELATED APPLICATIONS

This application claims the benefit of priority under 35USC § 119 to Japanese Patent Application No. 2003-390722 filed on Nov. 20, 2003, the entire contents of which are incorporated herein by reference.

BACKGROUND OF THE INVENTION

1. Field of the Invention

The present invention relates to a first-in first-out (FIFO) control circuit.

2. Related Background Art

Conventionally, a receiving circuit and a transmitting circuit in a certain device independently include FIFO buffers, respectively.

Accordingly, when the FIFO buffer in one circuit is used, sometimes the FIFO buffer in the other circuit is not used, and, in this case, the usability of the FIFO buffers becomes deteriorated.

For the configuration as described above, sometimes a FIFO buffer in which plural applications (for reception, transmission, etc.) can be set with a register and software is used and the FIFO buffer is shared between the receiving circuit and the transmitting circuit.

However, in this configuration, it is necessary to have divided an area of one FIFO buffer into areas for reception and transmission in advance with software. Accordingly, there is a possibility that the size of the FIFO buffer necessary for actual data transfer does not match the size of the secured FIFO buffer, and, in this case, the transfer efficiency of data becomes deteriorated.

SUMMARY OF THE INVENTION

According to an aspect of the present invention, there is provided a FIFO control circuit for passing receive data and transmit data in a first-in first-out system, respectively, the FIFO control circuit comprising a receiving circuit; a transmitting circuit; a FIFO buffer for temporarily storing receive data received by the receiving circuit and transmit data to be transmitted by the transmitting circuit; a free space management circuit for managing free space of the FIFO buffer; a first address storage unit for storing an address range in which the receive data is stored in the FIFO buffer; a second address storage unit for storing an address range in which the transmit data is stored in the FIFO buffer; a write pointer control circuit, in the case where receive data is received by the receiving circuit, for querying the free space management circuit about free space in the FIFO buffer, writing the receive data in free space designated by the free space management circuit, and storing an address range in which the receive data has been written in the first address storage unit, and, in the case where the transmit data is received from a transmission source, for querying the free space management circuit about free space in the FIFO buffer, writing the transmit data in free space designated by the free space management circuit, and storing an address range in which the transmit data has been written in the second address storage unit; and a read pointer control circuit for taking the address range from the first address storage unit in a first-in order and reading out the receive data stored in the address range from the FIFO buffer to output the data to a reception destination, and for taking the address range from the second address storage unit in a first-in order and reading out the transmit data stored in the address range from the FIFO buffer to output the data to the transmitting circuit.

According to an aspect of the present invention, there is provided a FIFO control circuit for passing receive data and transmit data in a first-in first-out system, respectively, the FIFO control circuit comprising: a receiving circuit; a transmitting circuit; a plurality of FIFO buffers for temporarily storing receive data received by the receiving circuit and transmit data to be transmitted by the transmitting circuit; a free space management circuit for managing free space of the plurality of FIFO buffers; a first address storage unit for storing an address range in which the receive data is stored in each of the FIFO buffers; a second address storage unit for storing an address range in which the transmit data is stored in each of the FIFO buffers; a write pointer control circuit, in the case where receive data is received by the receiving circuit, for querying the free space management circuit about FIFO buffer and free space of the FIFO buffer in which the receive data is to be written, writing the receive data in the free space of the FIFO buffer designated by the free space management circuit, and storing an identifier for identifying the designated FIFO buffer and an address range in which the receive data has been written in the first address storage unit as an address range with identifier, and, in the case where the transmit data is received from a transmission source, for querying the free space management circuit about FIFO buffer and free space of the FIFO buffer in which the transmit data is to be written, writing the transmit data in the free space of the FIFO buffer designated by the free space management circuit, and storing an identifier for identifying the designated FIFO buffer and an address range in which the transmit data has been written in the second address storage unit as an address range with identifier; and a read pointer control circuit for taking the address range with identifier from the first address storage unit in a first-in order, identifying the FIFO buffer based on the identifier included in the address range with identifier, and reading out the receive data stored in the address range from the identified FIFO buffer to output the data to a reception destination, and for taking the address range with identifier from the second address storage unit in a first-in order, identifying the FIFO buffer based on the identifier included in the address range with identifier, and reading out the transmit data stored in the address range from the identified FIFO buffer to output to the receiving circuit.

BRIEF DESCRIPTION OF THE DRAWINGS

FIGS. 6A to 6C and 7 show examples of free space management table;

FIGS. 13A and 13B show data examples within the receive pointer storage unit and the transmit pointer storage unit.

DETAILED DESCRIPTION OF THE INVENTION

Figure 1:
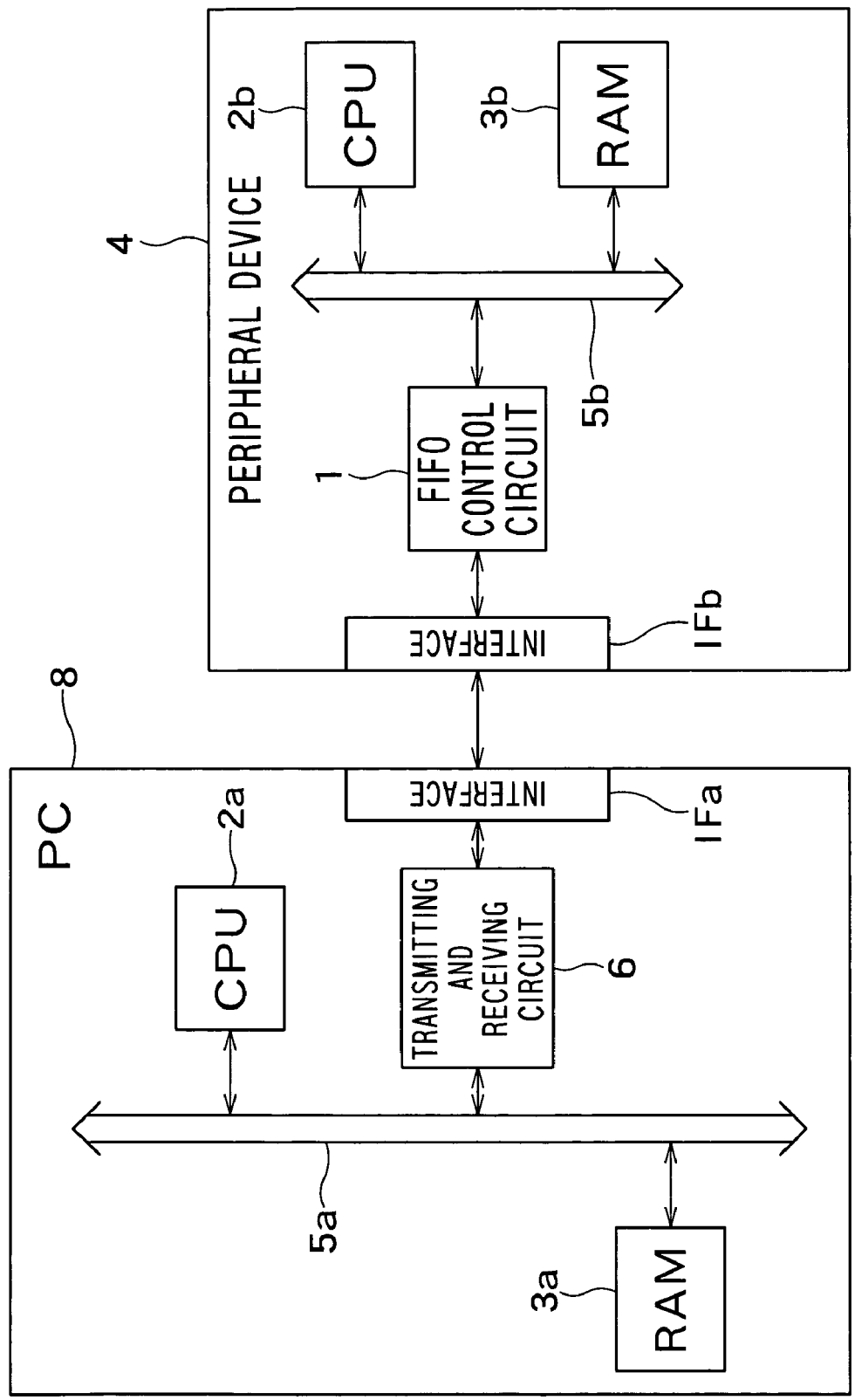
FIG. 1 shows a configuration example of a system using a FIFO control circuit as a first embodiment of the invention.

FIG. 1 shows a configuration of a system to which a FIFO control circuit as a first embodiment of the invention is applied.

As shown in FIG. 1, a computer 8 such as a personal computer and a peripheral device 4 such as a printer, mobile phone, digital camera, and scanner are connected via interfaces IFa and IFb, respectively, by a high-speed serial bus or the like, for example.

The computer 8 includes a RAM 3a in which various instructions and data have been stored and a CPU 2a for performing various kinds of arithmetic processing by executing the instructions within the RAM 3a, and the RAM 3a and the CPU 2a are connected to a data bus 5a for data transfer. To the data bus 5a, a transmitting and receiving circuit 6 is connected, and the transmitting and receiving circuit 6 is connected to the above described interface IFa.

On the other hand, the peripheral device 4 includes a CPU 2b and a RAM 3b as well as the computer 8, and these CPU 2b and RAM 3b are connected to a data bus 5b. To this data bus 5b, a FIFO control circuit 1 is connected, and the FIFO control circuit 1 is connected to the interface IFb. The FIFO control circuit 1 is for absorbing the difference in processing time between the computer 8 and the peripheral device 4 or the like when data is transferred between the computer 8 and the peripheral device 4.

Figure 2:
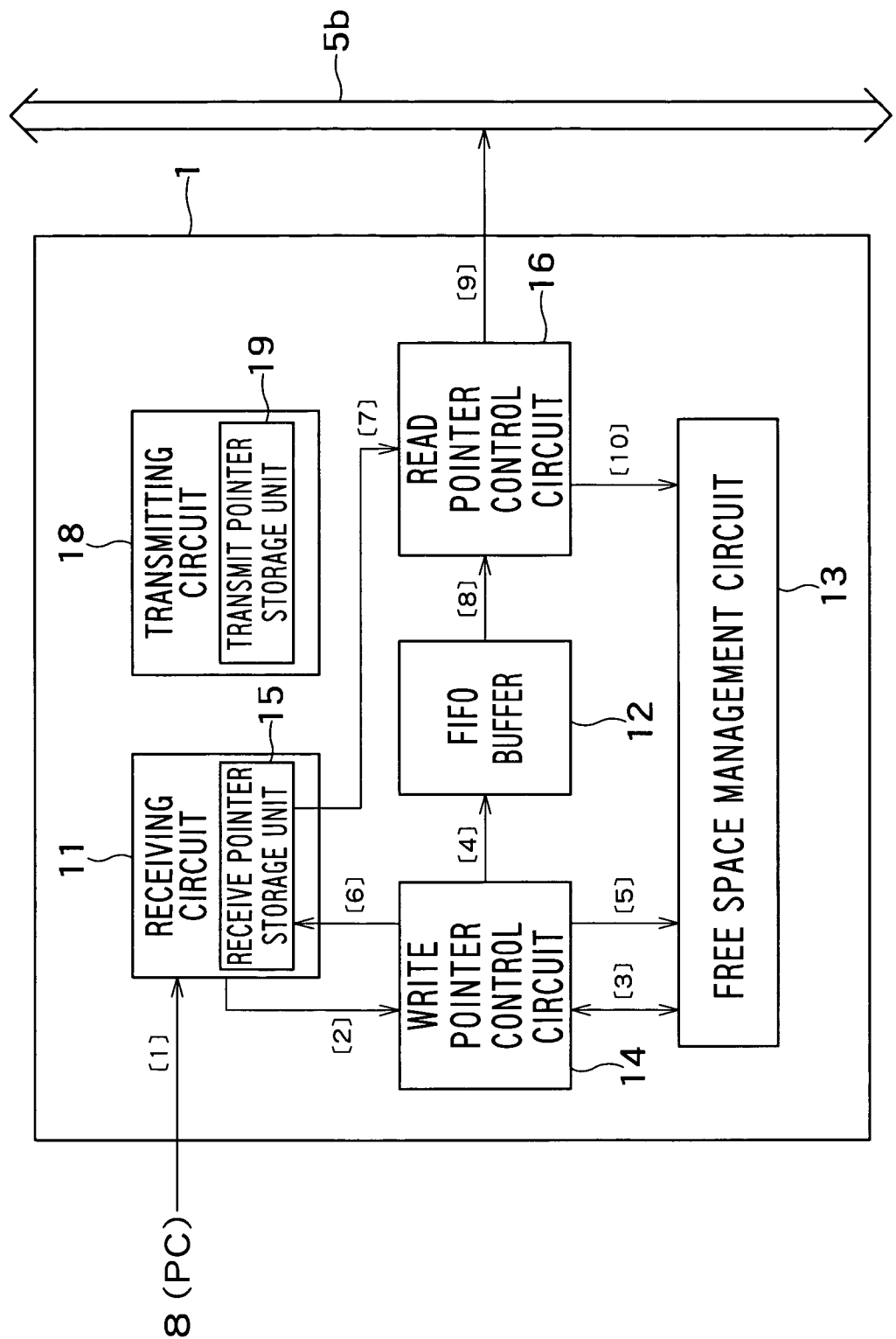
FIGS. 2 and 3 are block diagrams showing the configuration of the FIFO control circuit.
Figure 3:
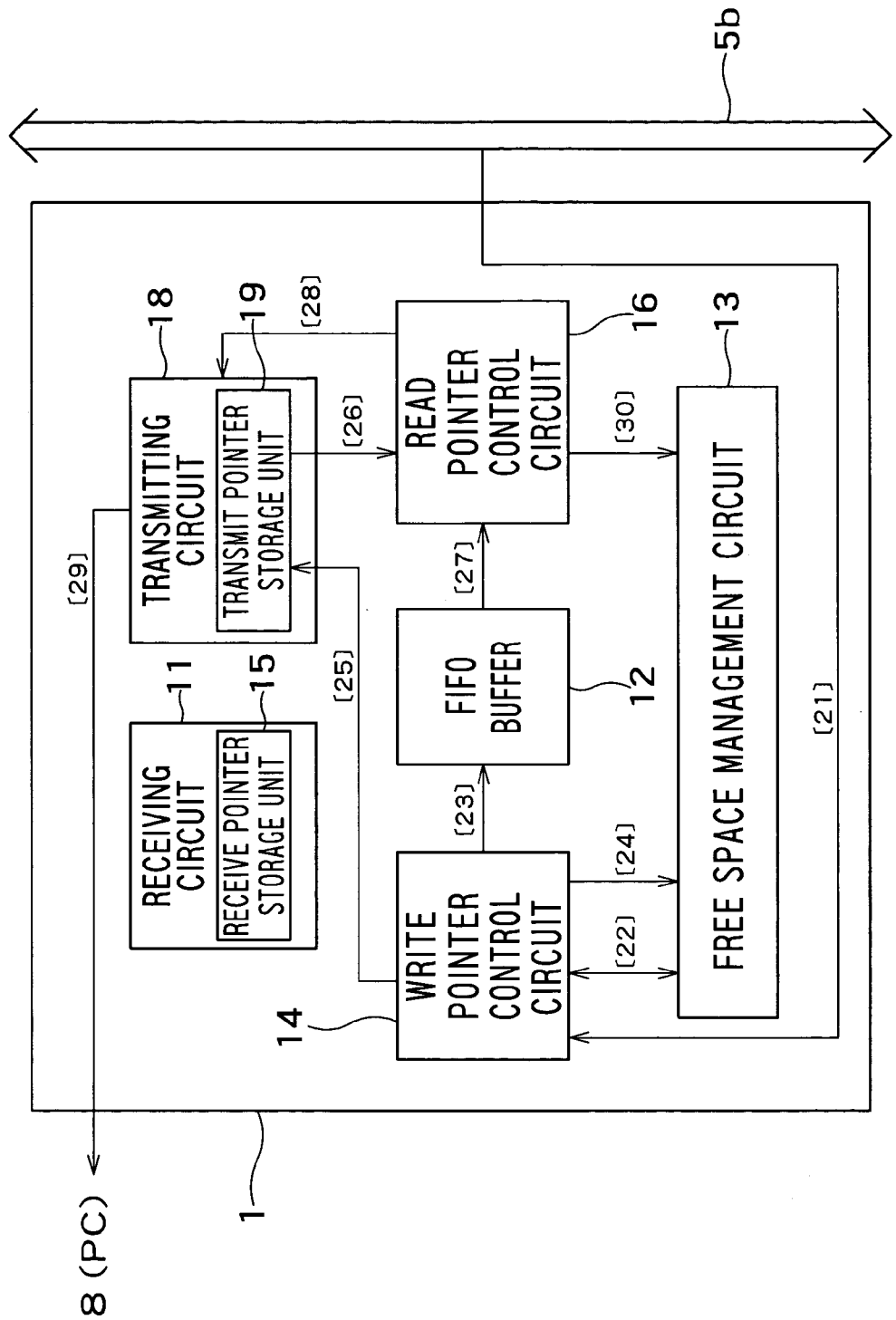

FIGS. 2 and 3 are block diagrams showing the configuration of the FIFO control circuit 1 in detail.

More specifically, FIG. 2 shows a flow of data when the data is transferred from the computer 8 to the peripheral circuit 4 (at the time of reception). FIG. 3 shows a flow of data when the data is transferred from the peripheral circuit 4 to the computer 8 (at the time of transmission).

As known by referring to FIGS. 2 and 3, the FIFO control circuit 1 is characterized by using a common FIFO buffer 12 at the times of reception and transmission. As below, the FIFO control circuit 1 will be described in detail.

First, using FIG. 2, the FIFO control circuit 1 at the time of reception will be described.

As shown in FIG. 2, the receiving circuit 11 receives data from the computer 8 ([1]). The receiving circuit 11 includes a receive pointer storage unit 15 (see FIG. 5A) for storing an address range in which receive data is written within the FIFO buffer 12.

The FIFO buffer 12 is for temporarily storing receive data and transmit data. The FIFO buffer 12 is of dual port type (a dual port RAM) having two ports for readout and write. The FIFO buffer 12 has address areas of 0x0000 to 0xFFFF, for example.

A free space management circuit 13 manages free space of the FIFO buffer 12 according to a free space management table, for example.

FIGS. 6A to 6C and FIGS. 7A to 7C show examples of the free space management table.

For example, FIG. 6A shows that address 0x0000 to address 0x3FFF are in use. FIG. 6B shows that address 0x0000 to address 0x3FFF and address 0x4000 to address 0x8FFF are in use.

Turning back to FIG. 2, a write pointer control circuit 14 receives receive data from the receiving circuit 11 ([2]) and queries the free space management circuit 13 about an area within the FIFO buffer 12 for storing the receive data ([3]).

The free space management circuit 13 calculates free space in the FIFO buffer 12 using the above described free space management table in response to the query from the write pointer control circuit 14, and returns a starting address (write start address) in the calculated free space to the write pointer control circuit 14 ([3]). When the free space management circuit 13 judges that there is no free space, the write pointer control circuit 14 discards receive data, for example.

When receiving the write start address, the write pointer control circuit 14 writes the receive data that has been received from the receiving circuit 11 from the write start address in the FIFO buffer 12 ([4]).

The write pointer control circuit 14 that has written the receive data notifies the last address (end address) in which the data has been written to the free space management circuit 13 ([5]).

The free space management circuit 13 registers the buffer area from the above described write start address to the end address in the free space management table as an address area in use.

On the other hand, the write pointer control circuit 14 stores the above described start address and end address in the receive pointer storage unit 15 ([6]).

Figure 5A:
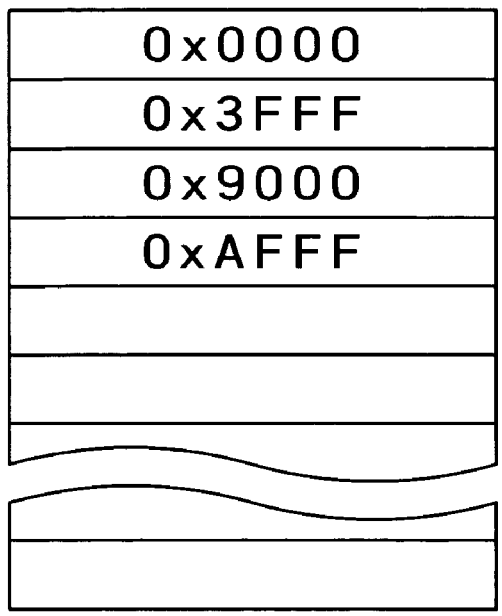
FIGS. 5A and 5B show data examples within a receive pointer storage unit and a transmit pointer storage unit.

FIG. 5A shows a data example within the receive pointer storage unit 15.

As shown in FIG. 5A, within the receive pointer storage unit 15, the write start address 0x0000 and end address 0x3FFF and the write start address 0x9000 and end address 0xAFFF are stored. Accordingly, in this example, it is known that receive data is stored in two buffer areas of the write start address 0x0000 to end address 0x3FFF and the write start address 0x9000 to end address 0xAFFF, respectively. The receive pointer storage unit 15 knows the order in which pairs of write start address and end address are written. In this example, the upper row a pair of write start address and end address are written in, the earlier it has been stored.

Turning back to FIG. 2, a read pointer control circuit 16 accesses the receive pointer storage unit 15 according to the instructions from the CPU 2b (see FIG. 1) or the like to acquire the write start address and end address that have been stored at the earliest time ([7]).

The read pointer control circuit 16 that has acquired the write start address and end address accesses the FIFO buffer 12 to acquire the receive data stored in the range of these addresses ([8]).

The read pointer control circuit 16 that has acquired the receive data sends out the acquired receive data onto the data bus 5b in the peripheral device 4 ([9]).

The read pointer control circuit 16 that has finished to send out the receive data sends the write start address and end address acquired from the receive pointer storage unit 15 to the free space management circuit 13 ([11]).

The free space management circuit 13 deletes the sent write start address and end address from the free space management table, and releases the buffer area in this range to make it usable.

Next, using FIG. 3, the FIFO control circuit 1 at the time of transmission will be described.

As shown in FIG. 3, the write pointer control circuit 14 receives transmit data from the data bus 5b in the peripheral device 4 ([21]).

The write pointer control circuit 14 that has received the transmit data queries the free space management circuit 13 about free space ([22]).

The free space management circuit 13 calculates free space using the free space management table, and returns a write start address to the write pointer control circuit 14 ([22]).

The write pointer control circuit 14 that has received the write start address writes the transmit data received from the data bus 5b from the write start address ([23]).

The write pointer control circuit 14 that has finished to write the transmit data returns the last address (end address) in which the transmit data is written to the free space management circuit 13 ([24]).

The free space management circuit 13 that has received the end address registers the write start address to the end address in the free space management table as a memory area in use.

On the other hand, the write pointer control circuit 14 stores the above described write start address and end address in a transmit pointer storage unit 19 in a transmitting circuit 18 ([25]).

Figure 5B:
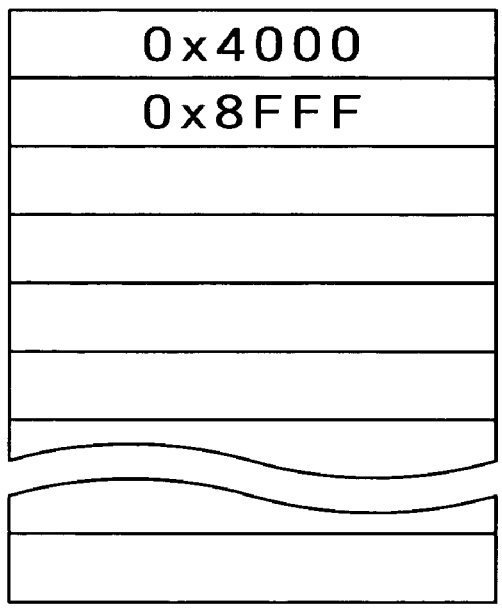

FIG. 5B shows an example of the write start address and the end address stored in the transmit pointer storage unit 19.

As shown in FIG. 5B, in the transmit pointer storage unit 19, the write start address 0x4000 and the end address 0x8FFF are stored. The transmit pointer storage unit 19 knows the order in which pairs of write start address and end address are written.

Turning back to FIG. 3, the read pointer control circuit 16 accesses the transmit pointer storage unit 19 according to the instruction from the CPU 2b, the transmitting circuit 18 or the like to acquire the write start address and end address that have been stored at the earliest time ([26]).

The read pointer control circuit 16 that has acquired the write start address and end address accesses the FIFO buffer 12 to acquire the transmit data stored in the range of the write start address and end address ([27]).

The read pointer control circuit 16 that has acquired the transmit data sends out the acquired transmit data to the transmitting circuit 18 ([28]).

The transmitting circuit 18 that has received the transmit data sends out the received transmit data to the computer 8 ([29]).

The read pointer control circuit 16 that has sent out the transmit data to the transmitting circuit 18 notifies the write start address and end address acquired from the transmit pointer storage unit 19 to the free space management circuit 13 ([30]).

The free space management circuit 13 deletes the passed write start address and end address from the free space management table, and releases the buffer area in this range to make it usable.

As understood from the above description, the FIFO control circuit 1 stores the receive data and the transmit data in an arbitrary area within the FIFO buffer 12.

As below, using FIGS. 2 to 7C, an example in which the FIFO control circuit 1 receives receive data (Rx_Packet1), transmit data (Tx_Packet1), and receive data (Rx_Packet2) (see FIG. 4) in this order, and stores them once in the FIFO buffer 12, and then, sends out the receive data and transmit data within the FIFO buffer 12 will be described.

Note that, at the beginning of the start of operation, no data has been stored in the free space management table, the receive pointer storage unit 15, the transmit pointer storage unit 19, and the FIFO buffer 12.

First, as shown in FIG. 2, the FIFO control circuit 1 receives the receive data (Rx_Packet1) from the computer 8 and stores it in the FIFO buffer 12.

More specifically, the receiving circuit 11 receives the receive data (Rx_Packet1) ([1]) and sends it out to the write pointer control circuit 14 ([2]).

The write pointer control circuit 14 that has received the receive data queries the free space management circuit 13 about the write start address ([3]). The free space management circuit 13 checks free space using the free space management table. Since the FIFO buffer 12 is free space entirely, the circuit 13 returns the starting address 0x0000 of the FIFO buffer 12 (see FIG. 4), for example, as a write start address to the write pointer control circuit 14 ([3]).

Figure 4:
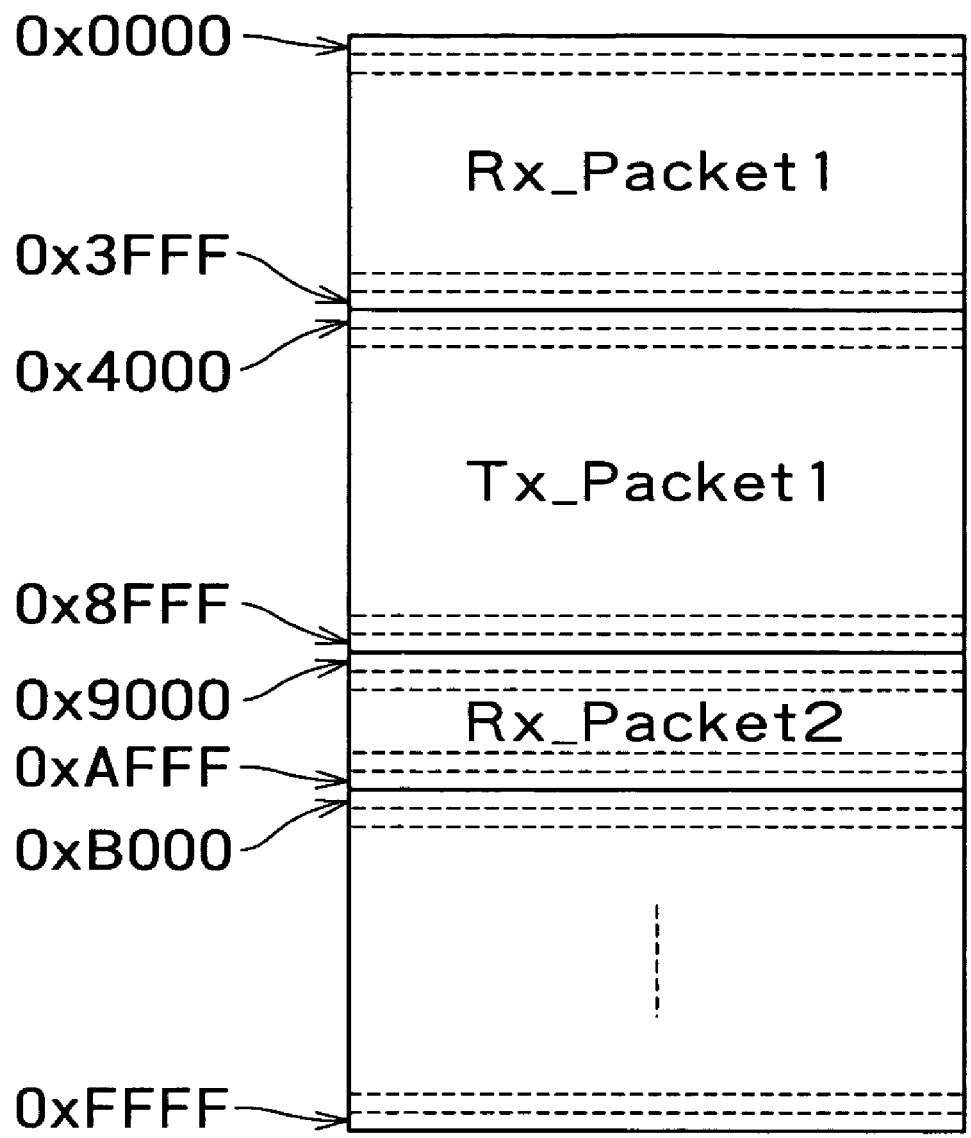
FIG. 4 shows a data example within a FIFO buffer.

The write pointer control circuit 14 that has received the write start address 0x0000 writes the receive data (Rx_Packet1) from the write start address 0x0000 in the FIFO buffer 12 as shown in FIG. 4.

The write pointer control circuit 14 that has written the receive data (Rx_Packet1) notifies the end address (0x3FFF) to the free space management circuit 13 ([5]).

The free space management circuit 13 that has received the end address registers the write start address 0x0000 and end address 0x3FFF in the free space management table as a buffer area in use as shown in FIG. 6A.

On the other hand, the write pointer control circuit 14 stores the above described write start address 0x0000 and end address 0x3FFF in the receive pointer storage unit 15 ([6]) as shown in FIG. 5A.

Next, as shown in FIG. 3, the FIFO control circuit 1 receives the transmit data (Tx_Packet1) from the data bus 5b and stores it within the FIFO buffer 12.

More specifically, first, the write pointer control circuit 14 receives the transmit data (Tx_Packet1) from the data bus 5b ([21]).

The write pointer control circuit 14 that has received the transmit data queries the free space management circuit 13 about the write start address ([22]). The free space management circuit 13 specifies the starting address 0x4000 in the free space using the free space management table (see FIG. 6A), and returns it to the write pointer control circuit 14 ([22]) as a write start address.

The write pointer control circuit 14 that has received the write start address writes the transmit data (Tx_Packet1) from the write start address 0x4000 as shown in FIG. 4 ([23]).

The write pointer control circuit 14 that has written the transmit data notifies the end address (0x8FFF) to the free space management circuit 13 ([24]).

The free space management circuit 13 that has received the end address registers the above described write start address 0x4000 and end address 0x8FFF in the free space management table as shown in FIG. 6B.

On the other hand, the write pointer control circuit 14 stores the above described write start address 0x4000 and end address 0x8FFF in the transmit pointer storage unit 19 ([25]) as shown in FIG. 5B.

Next, as shown in FIG. 2, the FIFO control circuit 1 receives the receive data (Rx_Packet2) from the computer 8 and stores it within the FIFO buffer 12.

More specifically, the receiving circuit 11 receives the receive data (Rx_Packet2) ([1]) and sends it out to the write pointer control circuit 14 ([2]).

The write pointer control circuit 14 that has received the receive data queries the free space management circuit 13 about the write start address of the receive data ([3]). The free space management circuit 13 returns a starting address 0x9000 (see FIG. 6B) in the rest address area 0x9000 to 0xFFFF to the write pointer control circuit 14 ([3]) using the free space management table.

The write pointer control circuit 14 that has received the write start address 0x9000 writes the receive data (Rx_Packet2) from the write start address 0x9000 as shown in FIG. 4 ([4]).

The write pointer control circuit 14 that has written the receive data (Rx_Packet2) notifies the end address (0xAFFF) of the receive data to the free space management circuit 13 ([5]).

The free space management circuit 13 that has received the end address registers the write start address 0x9000 and end address 0xAFFF in the free space management table as shown in FIG. 6C.

On the other hand, the write pointer control circuit 14 stores the write start address 0x9000 and end address 0xAFFF in the receive pointer storage unit 15 ([6]) as shown in FIG. 5A.

Thus, the receive data (Rx_Packet1), transmit data (Tx_Packet1), and receive data (Rx_Packet2) are sequentially stored within the FIFO buffer 12.

Next, the FIFO control circuit 1 sequentially sends out the receive data and the transmit data within the FIFO buffer 12. Note that it preferentially sends out the receive data.

First, as shown in FIG. 2, the FIFO control circuit 1 takes the receive data (Rx_Packet1) from the FIFO buffer 12 and sends it out onto the data bus 5b.

More specifically, the read pointer control circuit 16 accesses the receive pointer storage unit 15 according to the instructions from the CPU 2b or the like to acquire the write start address and end address (0x0000 and 0x3FFF) (see FIG. 5A) that have been stored at the earliest time ([7]). The read pointer control circuit 16 erases the write start address 0x0000 and end address 0x3FFF (not shown) within the receive pointer storage unit 15.

The read pointer control circuit 16 that has acquired the write start address and end address reads out receive data (Rx_Packet1) stored in the range from the write start address 0x0000 to end address 0x3FFF within the FIFO buffer 12 (see FIG. 4) ([8]) and sends it out onto the data bus 5b ([9]).

The read pointer control circuit 16 that has sent out the receive data sends out the above described write start address 0x0000 to end address 0x3FFF to the free space management circuit 13 ([10]). The free space management circuit 13 deletes the received write start address 0x0000 and end address 0x3FFF from the free space management table, and releases them to make them usable as shown in FIG. 7A.

Next, the FIFO control circuit 1 reads out the receive data (Rx_Packet2) within the FIFO buffer 12 and sends it out onto the data bus 5b.

More specifically, first, the read pointer control circuit 16 acquires the write start address 0x9000 and end address 0xAFFF within the receive pointer storage unit 15 according to the instructions from the CPU 2b or the like (see FIG. 5A) ([7]). The read pointer control circuit 16 that has acquired the write start address and end address erases the write start address 0x9000 and end address 0xAFFF within the receive pointer storage unit 15.

The read pointer control circuit 16 reads out the receive data (Rx_Packet2) stored in the range from the write start address 0x9000 to end address 0xAFFF within the FIFO buffer 12 (see FIG. 4) ([8]) and sends it out onto the data bus 5b ([9]).

The read pointer control circuit 16 that has sent out the receive data sends out the write start address 0x9000 and end address 0xAFFF to the free space management circuit 13 ([10]). The free space management circuit 13 deletes the received write start address 0x9000 and end address 0xAFFF from the free space management table as shown in FIG. 7B.

Next, as shown in FIG. 3, the FIFO control circuit 1 reads out the transmit data (Tx_Packet1) within the FIFO buffer 12 and sends it out to the computer 8.

More specifically, the read pointer control circuit 16 acquires the write start address 0x4000 and end address 0x8FFF within the transfer pointer storage unit 19 according to the instructions from the CPU 2b or the like (see FIG. 5B) ([26]). The read pointer control circuit 16 that has acquired the write start address and end address erases the write start address 0x4000 and end address 0x8FFF within the transfer pointer storage unit 19.

The read pointer control circuit 16 that has erased the data within the transfer pointer storage unit 19 reads out the transmit data (Tx_Packet1) stored in the write start address 0x4000 to end address 0x8FFF within the FIFO buffer 12 (see FIG. 4) ([27]) and sends it out to the transmitting circuit 18 ([28]).

The transmitting circuit 18 that has received the transmit data sends out the received transmit data to the computer 8.

On the other hand, the read pointer control circuit 16 sends out the write start address 0x4000 and end address 0x8FFF to the free space management circuit 13 ([30]). The free space management circuit 13 deletes the received write start address 0x4000 and end address 0x8FFF from the free space management table as shown in FIG. 7C.

Thus, the receive data (Rx_Packet1), receive data (Rx_Packet2), and transmit data (Tx_Packet1), within the FIFO buffer 12 are sequentially sent out.

As above, of the receive data and the transmit data stored within the FIFO buffer 12, the receive data is preferentially sent out, however, the transmit data may be preferentially sent out. Alternatively, the data may be sent out in the order in which the data are stored within the FIFO buffer.

Further, as above, the data storage in the FIFO buffer and the data readout from the FIFO buffer are performed so as not to be superposed temporally, however, these data storage and data readout may be performed simultaneously. For example, while the receive data (Rx_Packet1) is read out, the transfer data (Tx_Packet1) may be stored in the FIFO buffer 12.

In the above description, the respective data of the receive data and the transmit data are stored in the continuous areas within the FIFO buffer 12, respectively, however, when the data size is large and the continuous areas can not be secured, the data may be stored by being divided. As below, this will be described in detail.

Figure 8B:
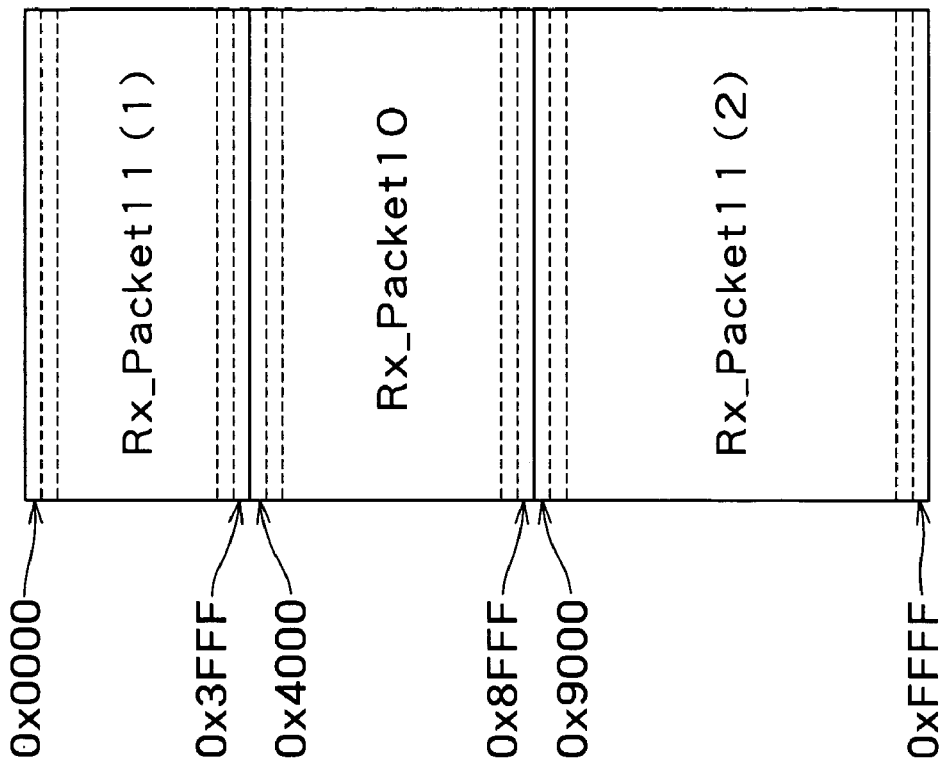
FIGS. 8A and 8B show data examples within the FIFO buffer.
Figure 8A:
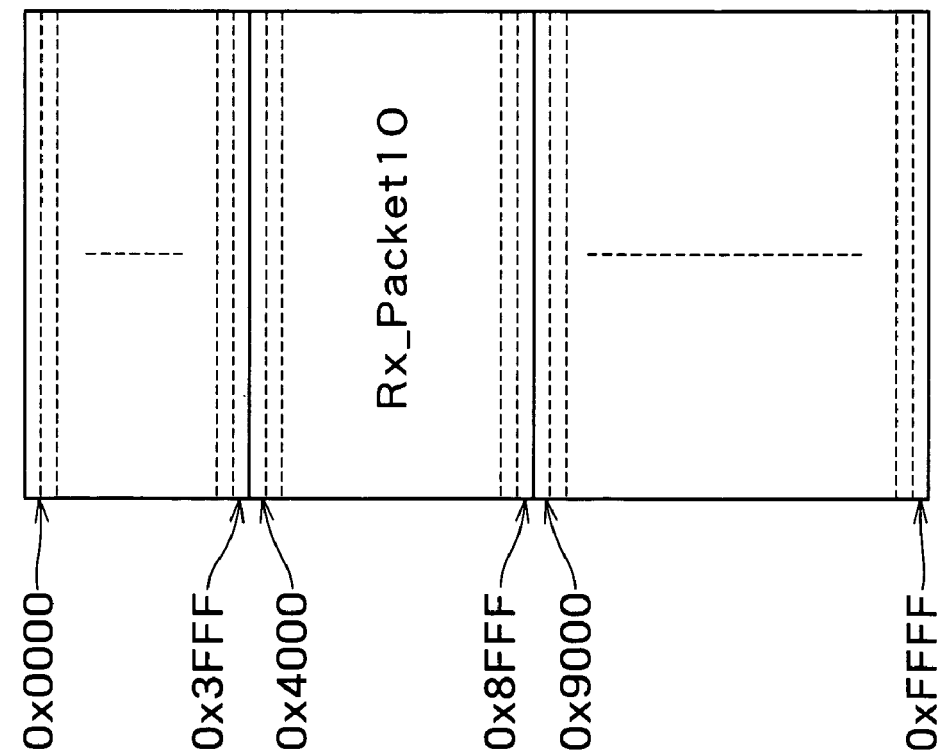

FIGS. 8A and 8B are diagrams for explanation of the case where receive data (Rx_Packet11) is divided and stored in the FIFO buffer 12.

Figure 9A:
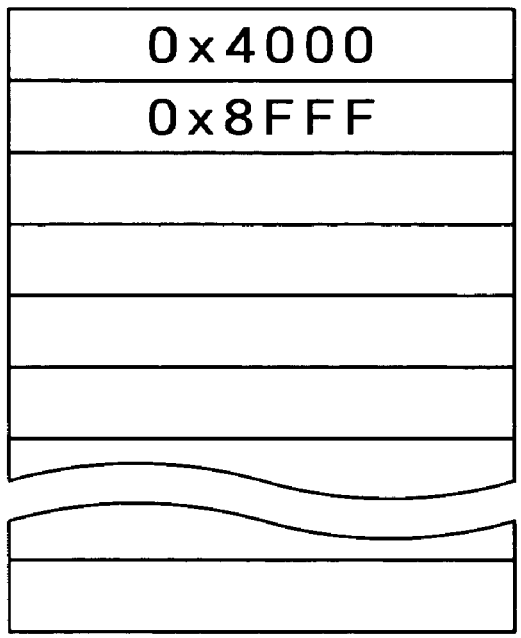
FIGS. 9A and 9B show data examples within the receive pointer storage unit.

As shown in FIG. 8A, within the FIFO buffer 12, receive data (Rx_Packet10) is stored. FIG. 9A shows data within the receive pointer storage unit 15.

In the condition of FIG. 8A, as shown in FIG. 8B, the write pointer control circuit 14 (see FIG. 2) divides the receive data (Rx_Packet11) into two (Rx_Packet11(1) and Rx_Packet11(2)) and stores them within the FIFO buffer 12. The write pointer control circuit 14 stores write start addresses and end addresses within the receive pointer storage unit 15 in response to the respective data (Rx_Packet11(1) and Rx_Packet11(2)). This state is shown in FIG. 9B.

Figure 9B:
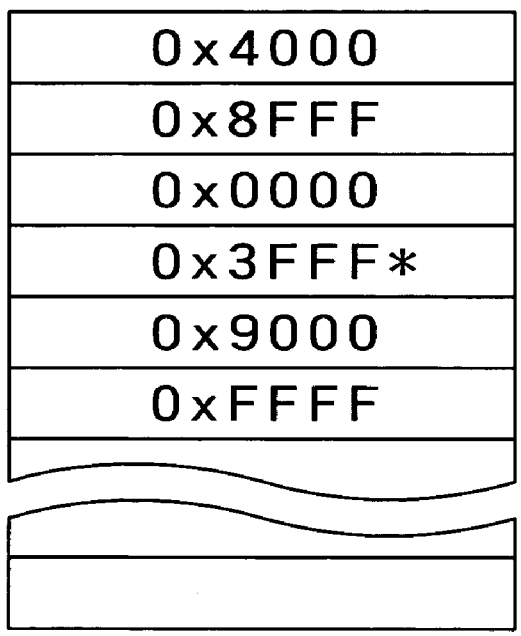

As shown in FIG. 9B, within the receive pointer storage unit 15, the write start address 0x0000 and end address 0x3FFF are stored in response to the Rx_Packet11(1) and the write start address 0x9000 and end address 0xFFFF are stored in response to the Rx_Packet11(2). "*" showing that the Rx_Packet11(1) and the Rx_Packet11(2) are originally the same data is assigned to the end address 0x3FFF.

Thus, when reading out the data, the read pointer control circuit 16 continuously reads out the Rx_Packet11(1) stored in the range from the write start address 0x0000 to end address 0x3FFF and the Rx_Packet11(2) stored in the range from the write start address 0x9000 to end address 0xFFFF, based on the "*".

As described above, according to the embodiment of the present invention, since an arbitrary area within the FIFO buffer is dynamically assigned according to applications, the FIFO buffer can be shared between plural applications (e.g., reception and transmission). Accordingly, the FIFO buffer can be used efficiently, and the area that the FIFO buffer occupies in the SOC (System On Chip) can be made smaller and the area of the entire chip can be reduced.

Next, a second embodiment of the invention will be described.

The FIFO control circuit in this embodiment is characterized by including two FIFO buffers. As below, the embodiment will be described in detail.

Figure 10:
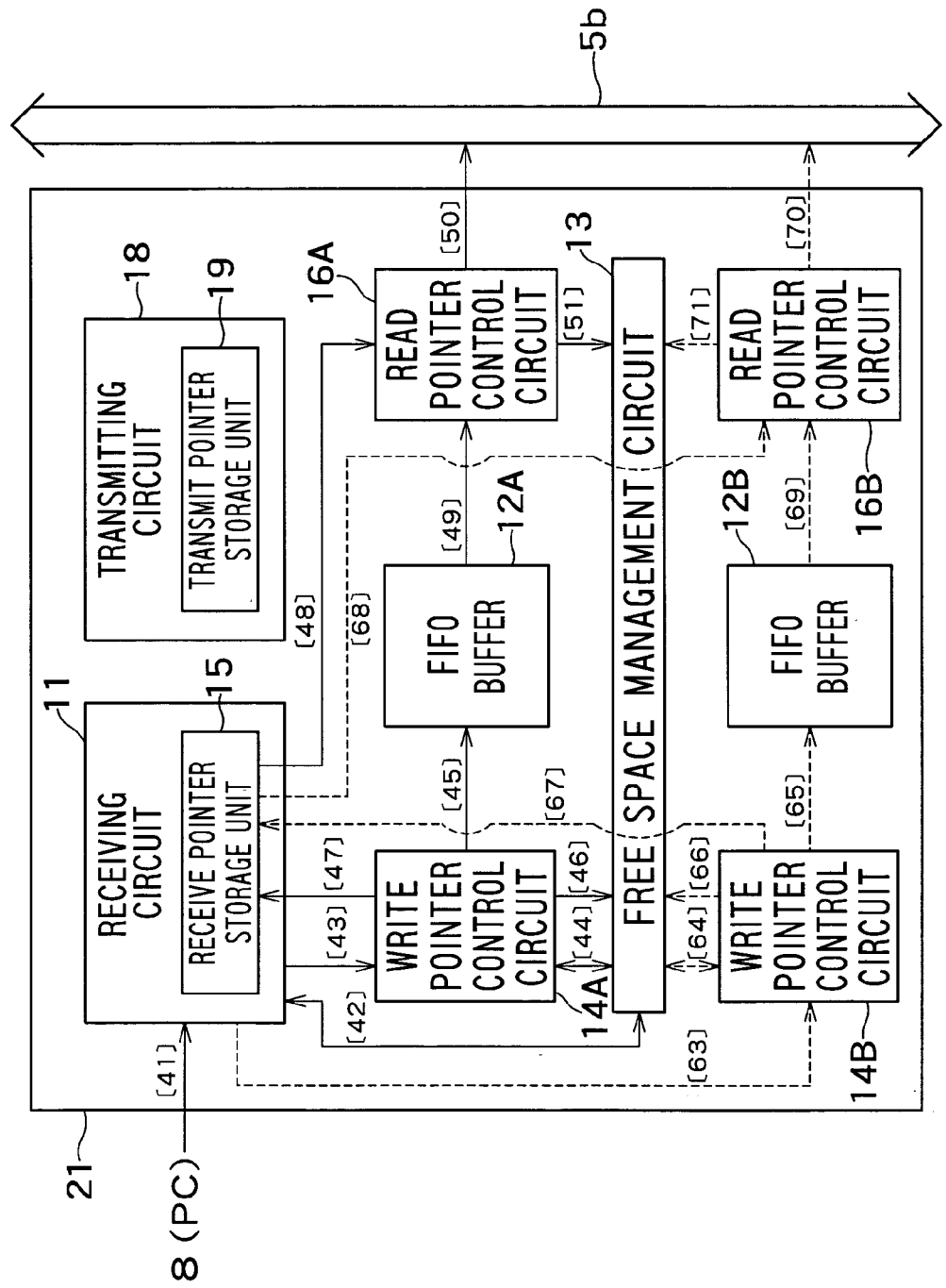
FIGS. 10 and 11 are block diagrams showing a FIFO control circuit as a second embodiment of the invention.
Figure 11:
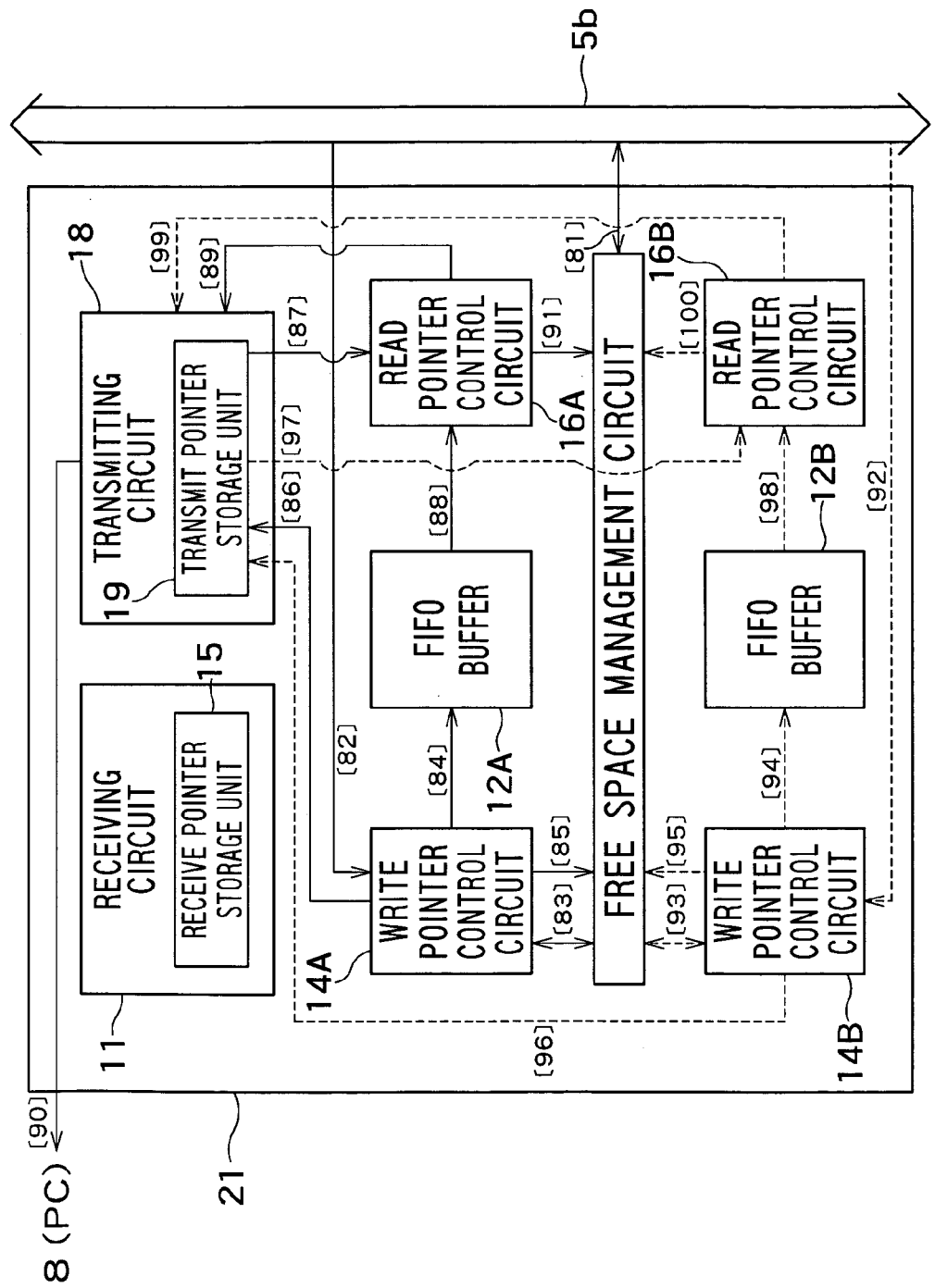

FIGS. 10 and 11 are block diagrams showing the configuration of a FIFO control circuit 21 as the second embodiment of the invention.

More specifically, in FIG. 10, solid line arrows show the flow of data when a FIFO buffer 12A is used at the time of reception ([41] to [50]), while broken line arrows show the flow of data when a FIFO buffer 12B is used at the time of reception ([63] to [70]).

On the other hand, in FIG. 11, solid line arrows show the flow of data when the FIFO buffer 12A is used at the time of transmission ([81] to [91]), while broken line arrows show the flow of data when the FIFO buffer 12B is used at the time of transmission ([92] to [100]).

As below, the FIFO control circuit 21 will be described in the cases of reception and transmission, respectively.

First, as shown in FIG. 10, at the time of reception, when the receiving circuit 11 receives receive data from the computer 8 ([41]), the circuit queries the free space management circuit 13 about to which of write pointer control circuits 14A and 14B it should pass the receive data ([42]). This free space management circuit 13 manages the two FIFO buffers 12A and 12B.

The free space management circuit 13 designates the write pointer control circuits 14A or 14B ([42]) so that the occupation rates of data in the FIFO buffers 12A and 12B may be substantially the same, for example. Alternatively, the free space management circuit 13 may preferentially designate the write pointer control circuit 14A, for example, and, when there becomes no free space in the FIFO buffer 12A, designate the write pointer control circuit 14B.

The receiving circuit 11 sends out the receive data to the designated write pointer control circuit 14A or 14B ([43] or [63]).

The designated write pointer control circuit 14A or 14B acquires a write start address from the free space management circuit ([44] or [64]), and writes the receive data from the write start address in the FIFO buffer 12A or 12B ([45] or [65]).

The write pointer control circuit 14A or 14B notifies an end address of the receive data to the free space management circuit 13 ([46] or [66]), and stores the write start address and the end address in the receive pointer storage unit 15 ([47] or [67]).

On the other hand, a read pointer control circuit 16A or 16B accesses the receive pointer storage unit 15 according to the instructions from the CPU 2b or the like to acquire the write start address and end address ([48] or [68]).

The read pointer control circuit 16A or 16B acquires the receive data stored in the range from the acquired write start address to end address from the FIFO buffer 12A or 12B ([49] or [69]), and sends it out onto the data bus 5b ([50] or [70]).

Then, the read pointer control circuit 16A or 16B sends out the write start address and end address to the free space management circuit 13 ([51] or [71]), and the free space management circuit 13 releases the buffer area in the address range to make it usable.

Next, as shown in FIG. 11, at the time of transmission, when sending out transmit data, the CPU 2b in the peripheral device 4 queries the free space management circuit 13 about to which of the write pointer control circuits 14A and 14B it should pass the transmit data ([81]). The free space management circuit 13 designates the write pointer control circuit 14A or 14B in the same manner as at the time of reception ([81]).

The CPU 2b sends out the transmit data to the designated write pointer control circuit 14A or 14B ([82] or [92]).

The designated write pointer control circuit 14A or 14B acquires a write start address from the free space management circuit ([83] or [93]), and writes the transmit data from the write start address in the FIFO buffer 12A or 12B ([84] or [94]).

The write pointer control circuit 14A or 14B notifies an end address of the transmit data to the free space management circuit 13 ([85] or [95]), and stores the write start address and the end address in the transmit pointer storage unit 19 ([86] or [96]).

On the other hand, the read pointer control circuit 16A or 16B acquires the write start address and end address from the transmit pointer storage unit 19 according to the instructions from the CPU 2b or the like ([87] or [97]). Specifically, first, the read pointer control circuit 16A or 16B accesses the unit 19, and, if the write start address and end address are not for the FIFO buffer 12A of which the circuit is in charge, the read pointer control circuit 16B accesses the unit 19.

The read pointer control circuit 16A or 16B acquires the transmit data stored in the range from the acquired write start address to end address from the FIFO buffer 12A or 12B ([88] or [98]), and sends it out to the transmitting circuit 18 ([89] or [99]).

The transmitting circuit 18 sends out the received transmit data to the computer 8 ([90]).

On the other hand, the read pointer control circuit 16A or 16B sends out the write start address and end address to the free space management circuit 13 ([91] or [101]), and the free space management circuit 13 releases the buffer area in the address range to make it usable.

Next, using FIGS. 10, 12A, 12B, 13A, and 13B, the operation of the FIFO control circuit 21 at the time of reception will be described specifically.

First, a precondition for describing the operation of the FIFO control circuit 21 will be described.

Figure 12A:
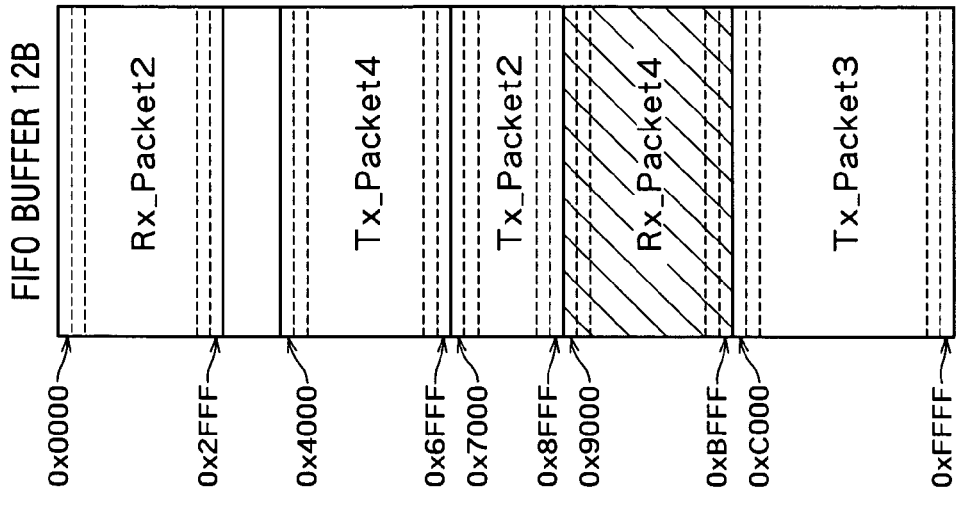
FIG. 12 shows data examples within FIFO buffers 12A and 12B.
Figure 12A:
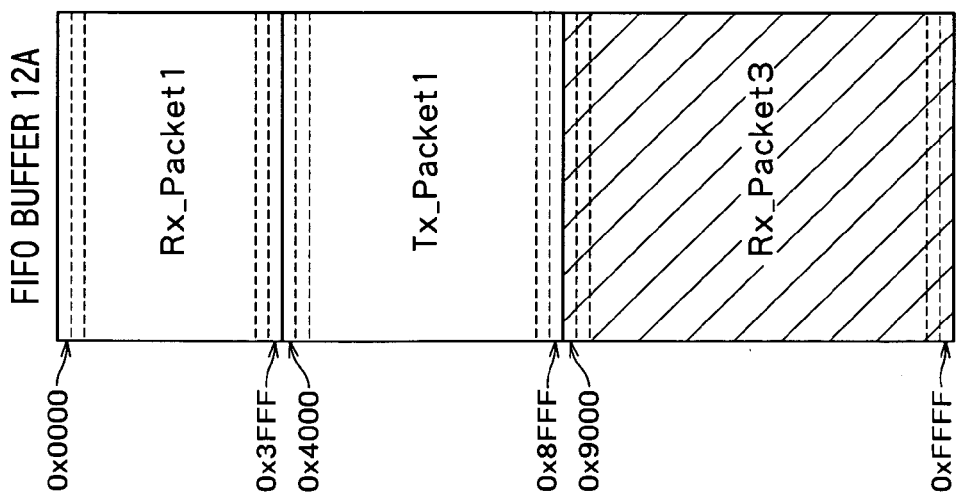

FIGS. 12A and 12B show data within the FIFO buffers 12A and 12B.

As shown in FIG. 12A, within the FIFO buffer 12A, receive data (Rx_Packet1) and transmit data (Tx_Packet1) are stored.

On the other hand, within the FIFO buffer 12B, receive data (Rx_Packet2) and transmit data (Tx_Packet2, Tx_Packet3, and Tx_Packet4) are stored.

The receive data (Rx_Packet3 and Rx_Packet4) shown by diagonal lines in FIGS. 12A and 12B have not yet stored at the present time.

FIG. 13A shows data within the receive pointer storage unit 15, and FIG. 13B shows data within the transmit pointer storage unit 19.

As shown in FIGS. 13A and 13B, within the receive pointer storage unit 15 and the transmit pointer storage unit 19, the write start addresses and end addresses corresponding to the data stored within the above described FIFO buffers 12A and 12B are stored. Note that, in FIG. 13A, the write start addresses and end addresses shown by the diagonal lines have not yet been stored at the present time.

Here, in FIGS. 13A and 13B, "arbitrary address_A" (e.g., 0x0000_A) shows that this arbitrary address (0x0000) is an address (0x0000) within the FIFO buffer 12A. On the other hand, "arbitrary address_B" (e.g., 0x0000_B) shows that this arbitrary address (0x0000) is an address (0x0000) within the FIFO buffer 12B.

Under the precondition, the operation of the FIFO control circuit 21 when the FIFO control circuit 21 receives two receive data (Rx_Packet3 and Rx_Packet4) (see FIGS. 12A and 12B) in this order will be described.

First, as shown in FIG. 10, when receiving the received data (Rx_Packet3) ([41]), the receiving circuit 11 queries the free space management circuit 13 about to which of write pointer control circuits 14A and 14B it should pass the receive data (Rx_Packet3) ([42]).

The free space management circuit 13 checks free space in the FIFO buffers 12A and 12B. There is free space in both of the FIFO buffers 12A and 12B (see the shaded parts in FIGS. 12A and 12B), however, here, giving the priority to the FIFO buffer 12A, the free space management circuit 13 designates the write pointer control circuit 14A for the receiving circuit 11 ([42]).

The receiving circuit 11 sends out the receive data (Rx_Packet3) to the write pointer control circuit 14A according to the instructions by the free space management circuit 13 ([43]).

The write pointer control circuit 14A queries the free space management circuit 13 about a write start address of the receive data (Rx_Packet3) ([44]).

The free space management circuit 13 returns the starting address 0x9000 in the free space (see FIG. 12A) to the write pointer control circuit 14A as a write start address ([44]).

The write pointer control circuit 14A that has received the write start address writes the receive data (Rx_Packet3) from the write start address 0x9000 ([45]) as shown in FIG. 12A.

The write pointer control circuit 14A notifies the end address 0xFFFF (see FIG. 12A) of the receive data (Rx_Packet3) to the free space management circuit 13 ([46]).

The free space management circuit 13 updates the free space management table with the write start address 0x9000 and end address 0xFFFF.

On the other hand, the write pointer control circuit 14A stores the write start address 0x9000 and end address 0xFFFF in the receive pointer storage unit 15 as 0x9000_A and 0xFFFF_A, respectively, as shown in FIG. 13A.

In this state, then, the receiving circuit 11 receives the receive data (Rx_Packet4) from the computer 8 ([41]). The receiving circuit 11 queries the free space management circuit 13 about to which of write pointer control circuits 14A and 14B it should pass the receive data ([42]).

The free space management circuit 13 checks free space in the FIFO buffers 12A and 12B. Since there is no free space in the FIFO buffer 12A (see FIG. 12A) but there is free space in the FIFO buffer 12B (see FIG. 12B), the free space management circuit 13 designates the write pointer control circuit 14B for the receiving circuit 11 ([42]).

The receiving circuit 11 sends out the receive data (Rx_Packet4) to the write pointer control circuit 14B according to the instructions by the free space management circuit 13 ([63]).

The write pointer control circuit 14B queries the free space management circuit 13 about a write start address of the receive data (Rx_Packet4) ([64]).

The free space management circuit 13 returns the starting address 0x9000 in the free space (see FIG. 12B) to the write pointer control circuit 14B as a write start address based on the free space management table ([64]).

The write pointer control circuit 14B writes the receive data (Rx_Packet4) from the write start address 0x9000 ([65]) as shown in FIG. 12B.

The write pointer control circuit 14B notifies the end address 0xBFFF (see FIG. 12B) of the receive data (Rx_Packet4) to the free space management circuit 13 ([66]).

The free space management circuit 13 updates the free space management table with the write start address 0x9000 and end address 0xBFFF.

On the other hand, the write pointer control circuit 14B stores the write start address 0x9000 and end address 0xBFFF in the receive pointer storage unit 15 as 0x9000_B and 0xBFFF_B, respectively, as shown in FIG. 13A.

Subsequently, the read pointer control circuit 16A or 16B reads out the pairs of write start address and end address within the receive pointer storage unit 15 or the transmit pointer storage unit 19 in the order in which the data are stored according to the instruction from CPU2b or the like. Then, the circuit takes the receive data or the transmit data from the FIFO buffer 12A or 12B and sends it out to the data bus 5b or the computer 8.

In the embodiment, the read pointer control circuits and the write pointer control circuits are provided for each of the two FIFO buffers, however, data write in the two FIFO buffers and data readout from the two FIFO buffers may be performed by one write pointer control circuit and one read pointer control circuit.

As described above, according to the second embodiment of the invention, since the free space management circuit is allowed to manage free space of plural FIFO buffers, the plural FIFO buffers can be shared.

What is claimed is:

1. A FIFO control circuit for passing receive data and transmit data in a first-in first-out system, respectively, the FIFO control circuit comprising:
   a receiving circuit;
   a transmitting circuit;
   a FIFO buffer for temporarily storing receive data received by the receiving circuit and transmit data to be transmitted by the transmitting circuit;
   a free space management circuit for managing free space of the FIFO buffer;
   a first address storage unit for storing an address range in which the receive data is stored in the FIFO buffer;
   a second address storage unit for storing an address range in which the transmit data is stored in the FIFO buffer;
   a write pointer control circuit, in the case where receive data is received by the receiving circuit, for querying the free space management circuit about free space in the FIFO buffer, writing the receive data in free space designated by the free space management circuit, and storing an address range in which the receive data has been written in the first address storage unit, and, in the case where the transmit data is received from a transmission source, for querying the free space management circuit about free space in the FIFO buffer, writing the transmit data in free space designated by the free space management circuit, and storing an address range in which the transmit data has been written in the second address storage unit; and a read pointer control circuit for taking the address range from the first address storage unit in a first-in order and reading out the receive data stored in the address range from the FIFO buffer to output the data to a reception destination, and for taking the address range from the second address storage unit in a first-in order and reading out the transmit data stored in the address range from the FIFO buffer to output the data to the transmitting circuit.

2. The FIFO control circuit according to claim 1, wherein the free space management circuit designates a starting address of the free space as the free space for the write pointer control circuit.

3. The FIFO control circuit according to claim 2, wherein the write pointer control circuit stores a starting address and a last address in which the receive data is stored in the FIFO buffer as the address range in the first address storage unit.

4. The FIFO control circuit according to claim 3, wherein the write pointer control circuit stores a starting address and a last address in which the transmit data is stored in the FIFO buffer as the address range in the second address storage unit.

5. The FIFO control circuit according to claim 4, wherein the write pointer control circuit notifies an end address of the address range in which the receive data or the transmit data has been written to the free space management circuit, and wherein the free space management circuit regards the address range between the starting address designated for the write pointer control circuit and the notified end address as being an area in use in the FIFO buffer.

6. The FIFO control circuit according to claim 5, wherein, after reading out the receive data or the transmit data, the read pointer control circuit notifies the address range from which the receive data or the transmit data has been read out to the free space management circuit, and wherein the free space management circuit regards an area in the FIFO buffer shown in the notified address range as being free space.

7. The FIFO control circuit according to claim 1, wherein, after reading out the receive data or the transmit data, the read pointer control circuit notifies the address range from which the receive data or the transmit data have been read out to the free space management circuit, and wherein the free space management circuit regards an area in the FIFO buffer shown in the notified address range as being free space.

8. The FIFO control circuit according to claim 1, wherein the free space management circuit designates a plurality of free space for the write pointer control circuit in the case where there is no continuous free space for storing the receive data, wherein the write pointer control circuit divides the receive data into a plurality of data and stores the data in the plurality of free space, and stores address ranges in which the respective divided receive data are stored in the first address storage unit, respectively, and wherein the read pointer control circuit takes the address ranges divided and stored in the first address storage unit, respectively, reads out the divided receive data stored in these address ranges from the FIFO buffer, respectively, and reproduces original receive data from the read out divided receive data and passes the data to the reception destination.

9. The FIFO control circuit according to claim 8, wherein the write pointer control circuit further stores information showing that the divided receive data stored in the respective address ranges form the same receive data in the first address storage unit, and wherein the read pointer control circuit reproduces the receive data from the divided receive data based on the information.

10. The FIFO control circuit according to claim 1, wherein the free space management circuit designates a plurality of free space for the write pointer control circuit in the case where there is no continuous free space for storing the transmit data, wherein the write pointer control circuit divides the transmit data into a plurality of data and stores the data in the plurality of free space, and stores address ranges in which the respective divided transmit data are stored in the second address storage unit, respectively, and wherein the read pointer control circuit takes the address ranges divided and stored in the second address storage unit, respectively, reads out the divided transmit data stored in these address ranges from the FIFO buffer, respectively, and reproduces original transmit data from the read out divided transmit data and output the data to the transmitting circuit.

11. The FIFO control circuit according to claim 10, wherein the write pointer control circuit further stores information showing that the divided transmit data stored in the respective address ranges form the same transmit data in the second address storage unit, and wherein the read pointer control circuit reproduces the transmit data from the divided transmit data based on the information.

12. The FIFO control circuit according to claim 1, wherein the receiving circuit receives the receive data from a communication network.

13. The FIFO control circuit according to claim 12, wherein the transmitting circuit outputs the transmit data received from the read pointer control circuit to the communication network.

14. The FIFO control circuit according to claim 1, wherein the read pointer control circuit outputs the received data read out from the FIFO buffer to a main bus to which a CPU is connected.

15. The FIFO control circuit according to claim 14, wherein the write pointer control circuit receives the transmit data from the main bus.

16. A FIFO control circuit for passing receive data and transmit data in a first-in first-out system, respectively, the FIFO control circuit comprising:

a receiving circuit;

a transmitting circuit;

a plurality of FIFO buffers for temporarily storing receive data received by the receiving circuit and transmit data to be transmitted by the transmitting circuit;

a free space management circuit for managing free space of the plurality of FIFO buffers;

a first address storage unit for storing an address range in which the receive data is stored in each of the FIFO buffers;

a second address storage unit for storing an address range in which the transmit data is stored in each of the FIFO buffers;

a write pointer control circuit, in the case where receive data is received by the receiving circuit, for querying the free space management circuit about FIFO buffer and free space of the FIFO buffer in which the receive data is to be written, writing the receive data in the free space of the FIFO buffer designated by the free space management circuit, and storing an identifier for identifying the designated FIFO buffer and an address range in which the receive data has been written in the first address storage unit as an address range with identifier, and, in the case where the transmit data is received from a transmission source, for querying the free space management circuit about FIFO buffer and free space of the FIFO buffer in which the transmit data is to be written, writing the transmit data in the free space of the FIFO buffer designated by the free space management circuit, and storing an identifier for identifying the designated FIFO buffer and an address range in which the transmit data has been written in the second address storage unit as an address range with identifier; and a read pointer control circuit for taking the address range with identifier from the first address storage unit in a first-in order, identifying the FIFO buffer based on the identifier included in the address range with identifier, and reading out the receive data stored in the address range from the identified FIFO buffer to output the data to a reception destination, and for taking the address range with identifier from the second address storage unit in a first-in order, identifying the FIFO buffer based on the identifier included in the address range with identifier, and reading out the transmit data stored in the address range from the identified FIFO buffer to output to the receiving circuit.

17. The FIFO control circuit according to claim 16, wherein a plurality of the write pointer control circuits and a plurality of the read pointer control circuits are located so as to correspond to the plurality of FIFO buffers, wherein each of the write pointer control circuits and each of the read pointer control circuits access the corresponding FIFO buffers, respectively, and wherein the address ranges with identifier within the first and second address storage unit are read out in a first-in order by the read pointer control circuits in charge.

18. The FIFO control circuit according to claim 17, wherein, in the case of receiving the receive data, the receiving circuit queries the free space management circuit about to which of the write pointer control circuits the processing is to be requested, and passes the receive data to the write pointer control circuit designated by the free space management circuit.

19. The FIFO control circuit according to claim 17, wherein, in the case of receiving an inquiry about to which of the write pointer control circuits the processing is to be requested from a transmission source of the transmit data, the free space management circuit outputs designation data for designating the write pointer control circuit to be requested for processing to the transmission source.

* * * * *